3,293,319
CATALYTIC DEHYDROGENATION OF
PARAFFINIC HYDROCARBONS
Vladimir Haensel, Hinsdale, and James Hoekstra, Evergreen Park, Ill., assignors to Universal Oil Products Company, Des Plaines, Ill., a corporation of Delaware
No Drawing. Filed Apr. 8, 1966, Ser. No. 541,066
14 Claims. (Cl. 260—683.3)

This application is a continuation-in-part of our copending application, Serial Number 527,051, filed February 14, 1966, and relates broadly to a process for effecting the dehydrogenation of saturated hydrocarbons to produce unsaturated hydrocarbons. More specifically, the invention described herein is directed toward a catalytic process for dehydrogenating a paraffinic hydrocarbon to an olefinic hydrocarbon, which process increases the quantity of paraffin conversions while simultaneously decreases the degree to which undesirable side reactions take place, thus increasing the efficiency of conversion. Through the practice of the present invention, and the use therein of a novel catalytic composite, an extended period of operation is afforded during which time the catalyst exhibits acceptable stability as a result of decreased carbon deposition thereupon.

The present invention is most advantageously applied to a process for the dehydrogenation of propane, n-butane, isobutane, n-pentane, isopentane and various paraffinic hydrocarbons containing six or more carbon atoms per molecule, including decane, undecane, dodecane, tridecane, etc., all of which may be successfully dehydrogenated to form olefinic hydrocarbons. In many instances, with certain modifications which will be apparent to those having skill in the art of petroleum processing techniques, a variety of cycloparaffins may be dehydrogenated to produce cycloolefins.

The uses of various olefinic hydrocarbons are numerous, and are applied with success in a wide variety of industries including the petroleum, petrochemical, heavy chemical, pharmaceutical, plastics industry, etc. For example, propylene is utilized in the manufacture of isopropyl alcohol, propylene dimer, trimer and tetramer, cumene, polypropylene, and in the synthesis of isoprene. Butene-1, cis-butene-2, and trans-butene-2 are extensively used in polymer and alkylate gasolines, in the manufacture of poly-butenes, butadiene, aldehydes, alcohols, cross-linking agents for polymers, and in the synthesis of various $C_4$ and $C_5$ derivatives. Isobutane finds use in the production of isooctane, butyl rubber, poly-isobutene resins, tertiary butyl chloride, copolymer resins with butadiene, acrylonitrile, etc. Pentenes are primarily employed in organic synthesis, although alpha-n-anylene (1-pentene) is often used as a component blending agent for high octane motor fuel. Long chain paraffins, having from 6 to about 18 carbon atoms per molecule, and especially those having from 10 to 14 carbon atoms, can be dehydrogenated to form an intermediate olefin for use in the manufacture of biodegradable detergents.

In order that a dehydrogenation process might achieve commercial success, the use of a suitable dehydrogenation catalyst is required. Thermal conversion of paraffins, to the corresponding olefins, can be carried out provided a sufficiently high temperature is utilized. However, due to high temperature pyrolysis, the main reaction is cracking which becomes undesirable from the standpoint of product quality and yield. At temperatures sufficiently low to avoid the deleterious cracking reactions, little or no conversion of paraffins takes place. The use of suitable dehydrogenation catalysts avoids this difficulty by permitting a relatively low temperature operation for dehydrogenation, while avoiding excessive cracking. It is recognized that the prior art processes for dehydrogenation are replete with suggestions of numerous catalysts which can be used in promoting the low temperature conversion of paraffins to olefins. Such catalysts generally consist of one or more metalic components from the metals of Groups VI and VIII of the Periodic Table, and compounds thereof. These catalysts are employed either unsupported, generally in powder or small particle form, or supported, or carried by a suitable refractory inorganic oxide material. Thus, suitable catalytic composites have been found to comprise one or more components selected from chromium, tungsten, molybdenum, iron, cobalt, nickel, platinum, palladium, iridium, ruthenium, rhodium, osmium, and various compounds thereof. These are generally composited with a carrier material comprising one or more inorganic oxides from the group of alumina, silica, zirconia, magnesia, thoria, hafnia, titania, boria, etc. Notwithstanding the wide variety of dehydrogenation catalysts, it becomes evident, from a perusal of the prior art, that any proposed catalyst appears to possess inherently one or more drawbacks which detract from the suitability and acceptability thereof. Some catalysts are too active, and to the extent that undesirable side reactions are promoted even at low temperatures. Others are too inactive at low temperatures to promote an acceptable degree of dehydrogenation. Still others are insufficiently stable to be effective for an extended period of time, and, as such, do not foster a commercially attractive process.

In conjunction with the various difficulties involved in selecting a suitable catalyst, there is the aspect of reaction equilibrium to consider. Dehydrogenation is generally effected at conditions including a temperature in the range of from 400° C. to about 700° C., a pressure from 0 to 100 pounds per square inch gauge, a liquid hourly space velocity within the range of from about 1.0 to about 10.0, and in the presence of hydrogen in an amount to result in a mol ratio of from 1:1 to about 10:1, based upon the paraffin charge. When operating at, or extremely close to equilibrium conversion, regardless of the character of the catalyst being used, or the degree to which it successfully promotes dehydrogenation, various side reactions, including at least some cracking, are also effected. For instance, in a process for the dehydrogenation of isobutane, at close to equilibrium conditions, a significant degree of isomerization to n-butane results. This, as well as other side reactions obviously detrimentally affect the efficiency of conversion to isobutylene, and tend to adversely affect the economic considerations of the process.

An object of the present invention is to provide a paraffin dehydrogenation process which can function at close to equilibrium without suffering from an excessive degree of side reactions leading to decreased efficiency, excessive cracking which results in the over-production of waste gases, or the deposition of carbon onto and within the catalyst, thereby shielding the active surfaces and centers thereof from the material being processed.

Another object of the present invention is to provide a novel four-component catalytic composite of an inorganic oxide carrier material, an alkali metal component, a Group VIII metal component and a catalytic attenuator from the group consisting of arsenic, antimony and bismuth.

Therefore, in a broad embodiment, the present invention relates to a process for the dehydrogenation of a paraffinic hydrocarbon, which process comprises contacting said hydrocarbon with a catalytic composite of lithiated alumina, a Group VIII metallic component and a metallic component selected from the group consisting of arsenic, antimony, bismuth and compounds thereof, at dehydrogenating conditions including a temperature within the range of from about 400° C. to about 700° C.

This process is further characterized in that a particularly preferred catalyst comprises lithiated alumina containing from about 0.05% to about 5.0% by weight of a Group VIII noble metal, and especially platinum. Although beneficial results are obtained at temperatures from about 400° C. to about 700° C., it is preferable to operate within an intermediate temperature range of from about 525° C. to 625° C. The pressure will be in the range of 0 to about 100 p.s.i.g., and most normally at least about 10 p.s.i.g., but not, however, substantially above 40 p.s.i.g. The pressure will be maintained upon the reaction zone by compressive hydrogen recycle in an amount such that the mol ratio of hydrogen to hydrocarbon charge is within the range of about 1:1 to about 10:1, the hydrocarbon charge rate being sufficient to result in a liquid hourly space velocity (defined as volumes of hydrocarbon charge per volume of catalyst disposed in the reaction zone) of from 1.0 to about 10.0.

Although the process described herein is especially advantageous for dehydrogenating paraffinic hydrocarbons of relatively low molecular weight, i.e. having from three to five carbon atoms per molecule, unusual results are obtained when the charge stock comprises those paraffins containing from six to about eighteen carbon atoms per molecule. As hereinafter indicated in specific examples, normal-undecane, dodecane and tridecane can be successfully dehydrogenated to olefins.

The fourth component of the catalytic composite is selected from the group consisting of arsenic, antimony, bismuth and compounds thereof. Of these, arsenic and antimony are preferred, and arsenic is particularly preferred. These catalytic attenuators are employed in amounts based upon the concentration of the Group VIII metallic component. For example, arsenic is present in an atomic ratio of platinum within the range of from 0.20 to about 0.45.

Thus, another embodiment of the present invention involves a catalytic composite of alumina, lithium, 0.05% to 5.0% by weight of platinum and arsenic in an atomic ratio to said platinum of from about 0.20 to about 0.45. It is understood that regardless of the precise form in which the various catalytic components exist, the concentrations are calculated as if they exist within the composite as the elemental metals.

The particularly preferred dehydrogenation catalyst, employed in the process of the present invention, makes use of a non-acidic, and especially halogen-free, refractory inorganic oxide carrier material. It is understood that alumina can properly be considered, under certain circumstances, to possess acidic properties; it reacts, for example, with strong bases. However, the term "non-acidic" is intended to preclude the use of halogen components and those inorganic oxides which possess the acidic function characteristic of material which fosters cracking reactions. This is combined with a Group VIII noble metal component, an alkali metal component and a catalytic attenuator as above described. In some instances, the catalyst will contain an alkaline-earth metal component, including calcium, magnesium and/or strontium, although the alkali metals, cesium, rubidium, potassium, sodium and especially lithium are preferred. The Group VIII noble metal, palladium, iridium, ruthenium, rhodium, osmium, and especially platinum, may exist within the composite as the element, as a chemical compound, or in physical association with the other catalyst components. In any event, the Group VIII metal will be in an amount of from about 0.05% to about 5.0% calculated as if existing as the elemental metal. The alkali metals will be utilized in an amount not generally exceeding 5.0% by weight; in order to achieve a proper balance between inhibiting the occurrence of side reactions, and imparting the desired degree of stability, the alkali metals will be used in significantly lower concentrations. Therefore, they will be present in a concentration within the range of from about 0.01% to about 1.5% by weight, calculated as the element. It is preferable to utilize alumina as the carrier material, without the addition thereto of acidic components which promote hydrocracking reactions. The utilization of any other inorganic oxide, in combination with the alumina, is usually dependent upon the desire to impart thereto certain physical and/or chemical characteristics.

The catalyst for use in the present process may be prepared in any suitable manner, and it is understood that the particular method chosen is neither essential to, nor limiting upon the present invention. In general, the alumina carrier material will be prepared and formed into the desired size and shape. The alkali metal, or alkaline-earth metal is added as an aqueous solution thereof, and thus may comprise a chloride, sulfate, nitrate, acetate, such as lithium nitrate, etc. Similarly, the platinum component may be composited in any suitable manner, one particularly convenient method involving the use of an impregnating solution of a water-soluble platinum compound such as chloroplatinic acid. The impregnated carrier is then dried at a temperature of from 100° F. to 300° F., and thereafter subjected to a calcination treatment at an elevated temperature of from 800° F. to about 1100° F.

An essential feature of the present invention involves the simultaneous use of a fourth catalytic component with the platinum and lithiated alumina. As hereinbefore set forth, this fourth component is selected from the group consisting of arsenic, antimony, bismuth, and compounds thereof. Of these, arsenic appears to yield the better results in most situations, and possesses an unusual affinity for the platinum, such that it remains within the catalytic composite for an extended period of time while processing the paraffinic charge stock. On the other hand, bismuth is least preferred since it appears to be most prone to removal from the composite during processing.

Although it can be shown that supported platinum-containing catalysts are very active in promoting the dehydrogenation of paraffinic hydrocarbons, they inherently possess additional, objectionable properties which stem from the overall activity and ability which platinum has for promoting other types of reactions. The alkali metal component effectively inhibits a substantial amount of the cracking reactions, by neutralizing at least a portion of the inherent acid function possessed by platinum, however, sufficient cracking activity remains such that higher temperature operation to increase conversion is precluded. Furthermore, there still is present the inherent capability of the platinum to promote undesirable isomerization reactions. This is further compounded by the fact that where higher temperature operation can be afforded to increase conversion without a substantial increase in cracking, there exists an accompanying increase in the tendency to promote isomerization. Thus, at a given temperature and conversion level, the addition of lithium for the purpose of decreasing cracking activity to permit increasing temperature to increase conversion of the paraffinic hydrocarbon falls short of economic acceptability due to the increased tendency toward isomerization, whereby the efficiency of conversion to the olefin suffers.

The primary function of the catalytic attenuator, arsenic, antimony or bismuth, is actually two-fold, although the intended effect is the same. That is, the catalyst attenuator is specifically intended to poison the platinum component to the extent that the remaining cracking activity thereof is virtually completely curtailed, and the tendency to promote isomerization reactions is substantially eliminated. The uniqueness of these attenuators resides in the fact that the dehydrogenation activity of the platinum component is not affected. As hereinafter indicated in a specific example, the doping action of the attenuator is highly selective in this regard. There is actually no dehydrogenation activity supplied by the attenuator, but rather a doping or poisoning effect directed toward two specific side reactions which the platinum component is otherwise capable of promoting. Where two catalysts were prepared, one with an arsenic attenuator, the other with one-half the quantity of platinum and no attenuator, the conversion in the case of the second catalyst decreased more than the cracking, whereas the attenuated catalyst inhibited cracking without decreasing conversion. Furthermore, there was a decrease in the degree to which isomerization of the paraffinic hydrocarbon was experienced.

Another advantage of the attenuated catalyst resides in the decreased production of undesirable diolefins. The use of the attenuator modifies the ratio in which the two dehydrogenation steps are effected, whereby the primary stage leading to the mono-olefin is not affected, but the secondary stage, resulting in the di-olefin, is reduced in intensity. There is also a suppression of the tendency for the mono-olefins to undergo polymerization, the products from which become deposited within and throughout the catalytic composite, thereby shielding the catalytically active sites from the material being processed. Through the increased conversion, the increased efficiency of conversion to the mono-olefin, and the increased stability of the catalytic composite, the overall beneficial effect resides in the resulting economic considerations involved in the effective catalyst life and the total quantity of desired olefin produced.

The following examples are presented for the purpose of illustrating the dehydrogenation process hereinbefore described and to indicate the benefits derived through the utilization thereof. It is not intended to limit the scope of the invention, as defined by the appended claims, to the catalyst, operating conditions, concentrations, charge stock, etc., used in these examples. Modification of these variables, within the aforesaid limits, may be made by those skilled in the art of petroleum refining operations, in order to achieve optimum economic advantage in a given situation.

The low molecular weight charge stock employed was commercial grade (99.0%) isobutane; an analysis of this stock indicated an isobutane content of 99.7%, with 0.3% normal butane being present. Analyses on the product gas stream were made by gas chromatography, and the concentrations reported in mol percent. Values for conversion and efficiency were obtained by converting the $C_3$ and lighter components of the hydrocarbon portion to their equivalent $C_4$ values, and adjusting the values to a basis of 100.0%. The conversion of isobutane is the difference between the residual isobutane and 100, and the efficiency is the net isobutylene produced divided by the conversion.

In the examples which follow, the catalyst was disposed, in an amount of 25 cc., in a stainless steel tube of ⅞-inch nominal inside diameter, equipped with an inner spiral preheater. Unless otherwise indicated, the operating conditions included a temperature of 575° C., a pressure of 10 p.s.i.g., the liquid hourly space velocity was either 2.0 or 4.0, and hydrogen was introduced with the charge in a mol ratio of 2:1, with respect to said charge. The non-attenuated catalyst was a commercially available alumina carrier which had been impregnated with chloroplatinic acid and lithium nitrate to yield a finished catalyst containing 0.75% or 0.375% by weight of platinum and 0.33% or 0.5% by weight of lithium. When this catalyst was doped with an attenuator, for example arsenic, an ammoniacal solution of an oxide, $As_2O_5$, was employed in an amount to give the desired atomic ratio of arsenic to platinum. The incorporation of the arsenic component was made by impregnating the lithiated alumina-platinum composite, followed by drying at about 210° F. and calcination in a muffle furnace for two hours at a temperature of 932° F. It is understood that the catalyst may be prepared in any suitable manner, and that no particular method is either essential to, or limiting upon the present invention.

*Example I*

In this example, as well as those immediately following, each individual test period was of 21 hours duration, with analyses being made during the first and twenty-first hours. A first test period at 10.0 p.s.i.g., 575° C., a 2:1 hydrogen to hydrocarbon mol ratio, and a liquid hourly space velocity of 2.0, using a non-lithiated alumina composite containing 0.75% by weight of platinum, resulted in an isobutane conversion to isobutylene of 23.8% during the first hour. The efficiency of conversion to isobutylene was 57.1%, and considerable cracking to $C_1$–$C_3$ paraffins was observed since 3.5 mol percent methane, 3.5 mol percent ethane and 10.9 mol percent propane was produced; also, the catalyst indicated the deposition thereon of 3.61% by weight of carbon.

A second test period, without changing the conditions of operation but with the platinum catalyst containing 0.33% by weight of lithium, resulted in a conversion to isobutylene of 29.2% (during the first hour), accompanied by an efficiency of conversion of 75.4%. The light paraffins indicated 2.4 mol percent methane, 0.9 mol percent ethane and 6.2 mol percent propane, and the catalyst analysis indicated carbon deposition of 0.85% by weight. Of interest is the fact that, at the twenty-first hour, the isobutylene conversion decreased only to 29.0%, but the efficiency of conversion increased to 91.5%. Furthermore, the cracking reactions decreased to the extent that only 0.7% methane, a trace quantity of ethane and 2.0% propane were produced.

A third test period, in which the catalyst contained arsenic in an atomic ratio to platinum of 0.31, the latter present in an amount of 0.75% by weight, alumina and 0.5% by weight of lithium, was performed under the same conditions of operation, with one exception. The residence time of the isobutane feed was decreased by increasing the liquid hourly space velocity to 4.0 from the 2.0 used in the two previous test periods. During the first hour, the isobutane conversion was 30.0%, and only decreased to 29.8% during the twenty-first hour. The yield of isobutylene during the twenty-first hour was 29.1%, for an efficiency of conversion of 97.7%. The addition of the arsenic to the lithiated alumina-platinum catalyst virtually eliminated isomerization and cracking reactions, since the total light paraffins, $C_1$–$C_3$, was 0.7%, and only 0.33% by weight of carbon was found on the catalyst.

The results obtained during the third test period are even more surprising in view of the fact that the liquid hourly space velocity was double that employed during the first two test periods. The following Table I summarizes the results during the first hour of these three test periods:

TABLE I

| Period No. | 1 | 2 | 3 |
|---|---|---|---|
| Catalytic Components on Alumina | Pt | Pt-Li | Pt-Li-As |
| Conversions, mol percent: | | | |
| Of Isobutane | | | 30.0 |
| To Isobutylene | 23.8 | 29.2 | 29.1 |
| Efficiency of Conversion | 57.1 | 75.4 | 97.7 |
| Light Paraffins Products, mol percent: | | | |
| Methane | 3.5 | 2.4 | |
| Ethane | 3.5 | 0.9 | 0.7 |
| Propane | 10.9 | 6.2 | |
| Carbon on Catalyst, percent | 3.61 | 0.85 | 0.33 |

*Example II*

In order to attempt to determine the effect which the attenuators have upon the platinum component, three test periods were performed at operating conditions of 10.0 p.s.i.g., a temperature of 575° C., a hydrogen to hydrocarbon mol ratio of 2.0 and a liquid hourly space velocity of 4.0. The three catalysts employed were: (a) alumina, 0.5% by weight of lithium, 0.75% by weight of platinum, and arsenic in an atomic ratio to platinum of 0.31; (b) alumina, 0.5% by weight of lithium and 0.75% by weight of platinum; and (c) alumina, 0.5% by weight of lithium and 0.375% by weight of platinum. The results are presented in the following Table II:

TABLE II

| Catalyst Designation | A | B | C |
|---|---|---|---|
| Platinum, wt. percent | 0.75 | 0.75 | 0.375 |
| Arsenic, Atomic Ratio | 0.31 | 0 | 0 |
| Lithium, wt. percent | 0.50 | 0.50 | 0.50 |
| Conversions, mol. percent: | | | |
| Of Isobutane | 29.8 | 23.2 | 15.7 |
| To Isobutylene | 29.1 | 21.6 | 14.5 |
| Efficiency | 97.7 | 93.2 | 92.4 |
| Light Paraffins Produced, mol. percent | 0.7 | 1.6 | 1.2 |
| Carbon Deposition, wt. percent | 0.33 | 0.51 | 0.08 |

All the results given in Table II are those obtained during the twenty-first hour of each test period. Upon comparing catalysts (B) and (C), when the platinum content is halved, it is noted that the overall activity of the catalyst decreases, although efficiency does not appear to be substantially affected, and that conversion has decreased more than cracking. Upon comparing catalysts (A) and (B), the addition of arsenic is seen to result in a very substantial decrease in cracking, but no decrease in the conversion or efficiency. This leads to the conclusion that the effect of arsenic is very selective, and not merely one of removing platinum from total catalytic action.

*Example III*

Five test periods, each of twenty-one hours' duration, were performed at operating conditions of 10.0 p.s.i.g., a temperature of 575° C., a hydrogen to hydrocarbon mol ratio of 2.0 and a liquid hourly spaced velocity of 4.0. Five different catalytic compositions were tested, each of which containing 0.5% by weight of lithium and 0.75% by weight of platinum, but varying concentrations of arsenic. The results are presented in Table III following:

TABLE III

| Catalyst Designation | D | E | F | G | H |
|---|---|---|---|---|---|
| Arsenic Atomic Ratio | 0 | 0.21 | 0.31 | 0.47 | 1.30 |
| Conversions, mol percent: | | | | | |
| Of Isobutane | 23.2 | 27.4 | 29.8 | 22.6 | 5.8 |
| To Isobutylene | 21.6 | 26.4 | 29.1 | 21.7 | 5.3 |
| Efficiency | 93.2 | 96.4 | 97.7 | 96.0 | 91.4 |
| Light Paraffins Produced | 1.6 | 1.0 | 0.7 | 0.9 | 0.5 |
| Carbon Deposition on Catalyst | 0.51 | 0.24 | 0.33 | 0.07 | 0.05 |

All the results appearing in Table III are those observed during the last hour of the 21-hour test period. When considering the quantity of isobutane converted, and the efficiency of the conversion to isobutylene, it is readily ascertained that the attenuator should be present in an amount to result in an atomic ratio to platinum of about 0.20 to about 0.45. When either below, or above this limitation, both the activity and efficiency of the catalyst are adversely affected.

*Example IV*

Normal undecane was charged to a reaction zone at a temperature of about 430° C., the zone being maintained under an imposed hydrogen pressure of 10.0 p.s.i.g. The charge rate was such that the liquid hourly space velocity was 2.0, and the hydrogen recycle rate in an amount to provide a hydrogen/hydrocarbon mol ratio of 4:1. The catalyst was alumina, 0.5% by weight of lithium, 0.75% by weight of platinum and 0.5 atoms of arsenic per atom of platinum. The efficiency of conversion to olefins was 90.0%, the remaining 10.0% being aromatic hydrocarbons, and there was no evidence that cracking and/or isomerization reactions had been effected. It is believed that these results would have been improved had the arsenic been present in a lower concentration of about 0.3 to about 0.45 atom per atom of platinum.

*Example V*

For this illustration, the charge stock was a mixture of dodecane (61.0%) and tridecane (39.0%). The catalyst was alumina, 0.75% platinum, 0.5% lithium and 0.3 atom of arsenic per atom of platinum. The reaction zone was maintained under an imposed hydrogen pressure of 15.0 p.s.i.g., the hydrogen recycle rate being of an amount to result in a hydrogen/hydrocarbon mol ratio of 8.8. The paraffin charge rate was 7.4 volumes per hour, per volume of catalyst disposed within the reaction zone. The operating temperature, at the inlet to the catalyst bed, was 460° C. These conditions obtained after the catalytic composite had been processing the $C_{12}$–$C_{13}$ mixture for 570 hours, and were held at the indicated levels for the next six hours. Analyses on the six-hour product effluent showed a $C_{12}$ disappearance of 12.8% and a $C_{13}$ disappearance of 14.4%. Furthermore, the selectivity of conversion to mono-olefins, at 576 hours, was 96.3%, the remaining 3.7% being $C_{12}$ and $C_{13}$ di-olefins.

*Example VI*

As hereinbefore set forth, the dehydrogenation process of the present invention is applicable to the conversion of cycloparaffins into cycloolefins. To illustrate this particular embodiment, the conversion of methylcyclopentane to methylcyclopentene will be considered. Methylcyclopentane (MCP) occurs to a significant extent in the lighter hydrocarbon distillates, and is considered valuable as a precursor of benzene. Whereas such a reaction is desirable in a catalytic reforming process, using a platinum-alumina-halogen catalyst, the conversion to benzene is an undesirable side reaction where the product is intended to be methylcyclopentene.

In addition to the benzene side reaction, a successful process for dehydrogenating MCP must necessarily avoid cracking, or ring-opening, as well as isomerization to cyclohexane, and isomerization of the methylcyclopentene to cyclohexene. The addition of lithium to a non-acidic alumina-platinum catalyst effectively inhibits the isomerization reactions leading to cyclohexene and benzene production, while the addition of the attenuator, and especially arsenic, avoids residual cracking and particularly inhibits ring-opening.

MCP is charged to a reaction zone, containing a catalytic composite of alumina, 0.75% by weight of platinum, 0.5% by weight of lithium and an atomic ratio of arsenic to platinum of 0.31:1, at a liquid hourly space velocity of about 10.0. The reaction zone is maintained at a pressure of 75.0 p.s.i.g. by compressive hydrogen recycle in an amount to provide a hydrogen/hydrocarbon mol ratio of 5:1. The catalyst inlet bed temperature is held at a level of 510° C. for a period of about six hours, during which time a composite sample of the liquid product effluent is obtained. Analysis on the composite sample shows an efficiency of conversion to methylcyclopentene of about 92.0%, the remaining 8.0% being benzene. There was no evidence to the effect that either the MCP, or the methylcyclopentene product suffered from ring-opening and/or cracking.

The foregoing specification and examples indicate the method involved in the process of the present invention, and clearly show the benefits to be afforded through the utilization thereof. Through the use of the present process and catalyst, the hydrogenation of saturated, or paraffinic hydrocarbons can be carried out with a substantial degree of conversion, to high efficiency, and for an extended period of time.

We claim as our invention:

1. A process for dehydrogenating a saturated hydrocarbon which comprises contacting said saturated hydrocarbon with a catalytic composite of alumina, from about 0.01% to about 1.5% by weight of lithium, from about 0.05% to about 5% by weight of a Group VIII metallic component and a metallic component selected from the group consisting of arsenic, antimony, bismuth and compounds thereof, at dehydrogenation conditions including a temperature within the range of from about 400° C. to about 700° C., the second-mentioned metallic component being in sufficient amount to inhibit the cracking and isomerizing activity of said Group VIII component at said conditions.

2. The process of claim 1 further characterized in that said Group VIII metallic component comprises platinum.

3. The process of claim 1 further characterized in that said saturated hydroccarbon contains from three to eighteen carbon atoms per molecule.

4. The process of claim 1 further characterized in that said catalytic composite comprises from about 0.05% to about 5.0% by weight of platinum, calculated as the elemental metal.

5. The proces of claim 1 further characterized in that said second-mentioned metallic component is in an atomic ratio to said Group VIII component of from about 0.20 to about 0.45.

6. The process of claim 1 further characterized in that said catalytic composite comprises platinum and arsenic in an atomic ratio to platinum from about 0.20 to about 0.45.

7. The process of claim 1 further characterized in that said saturated hydrocarbon is isobutane.

8. The process of claim 1 further characterized in that said saturated hydrocarbon is normal butane.

9. The process of claim 1 further characterized in that said saturated hydrocarbon is propane.

10. The process of claim 1 further characterized in that said saturated hydrocarbon is pentane.

11. The process of claim 3 further characterized in that said saturated hydrocarbon is methylcyclopentane.

12. The process of claim 3 further characterized in that said saturated hydrocarbon contains from about 10 to about 14 carbon atoms per molecule.

13. The process of claim 12 further characterized in that said saturated hydrocarbon is normal undecane.

14. The process of claim 12 further characterized in that said saturated hydrocarbon is a mixture of dodecane and tridecane.

No references cited.

DELBERT E. GANTZ, *Primary Examiner.*

G. E. SCHMITKONS, *Assistant Examiner.*